INVENTORS
FRANK ZANKL AND
EARL R. LOHNEIS
BY
Robert C Jones

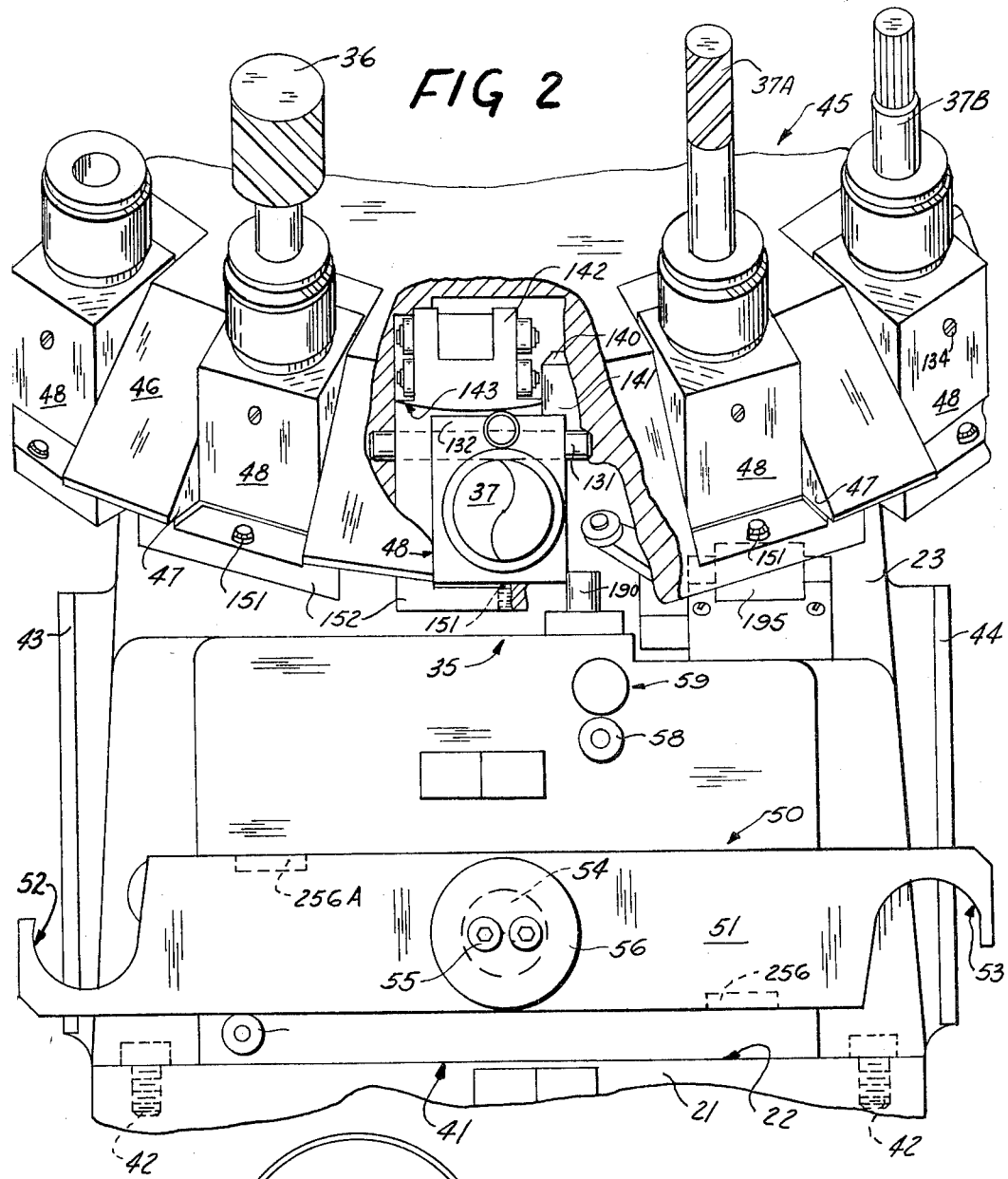
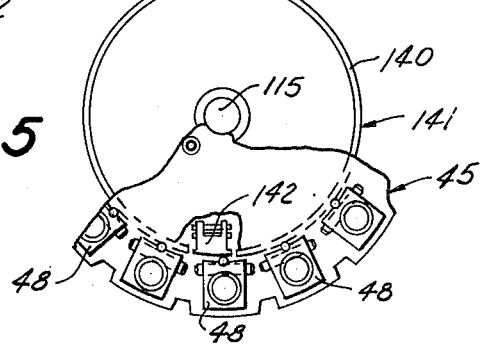

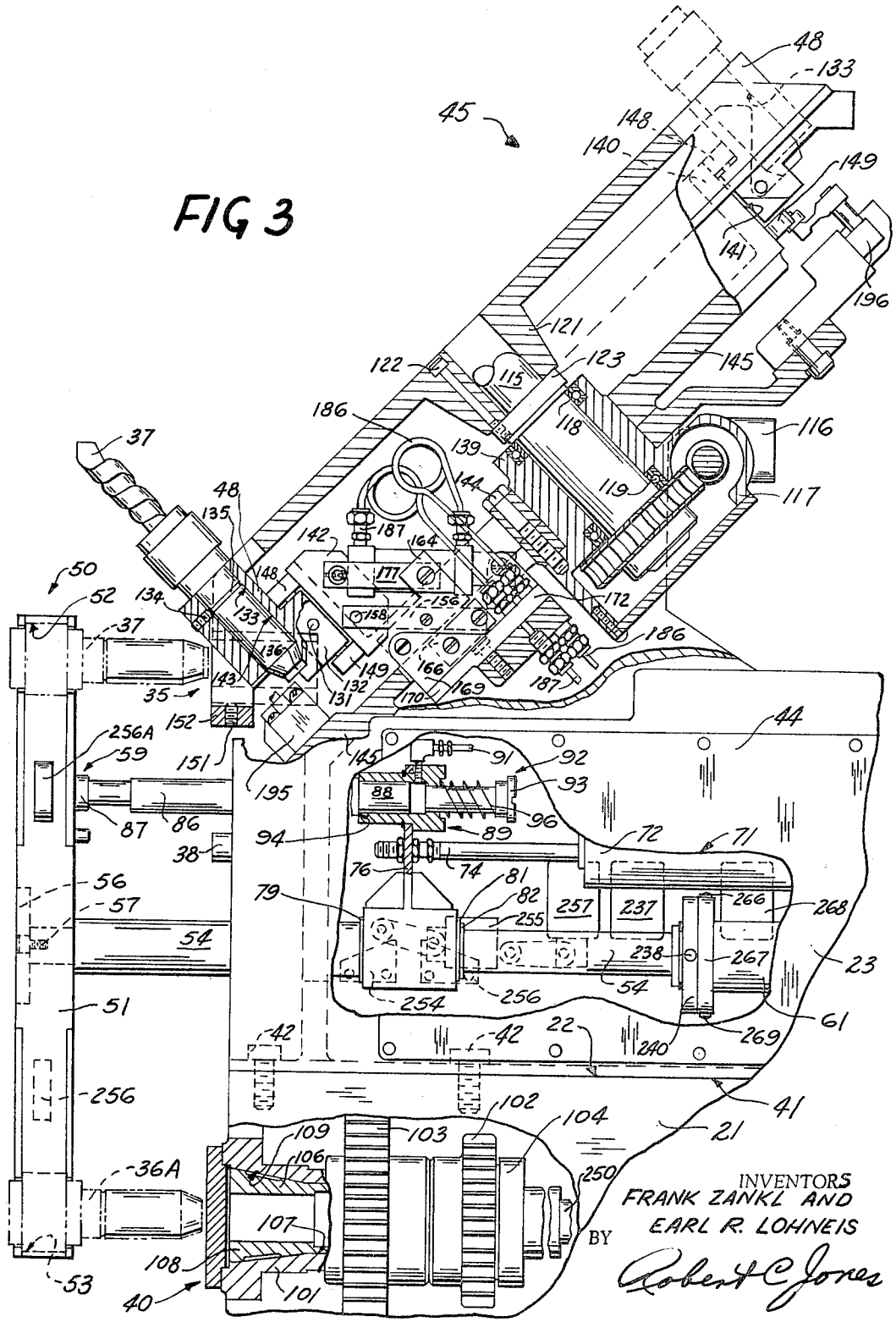

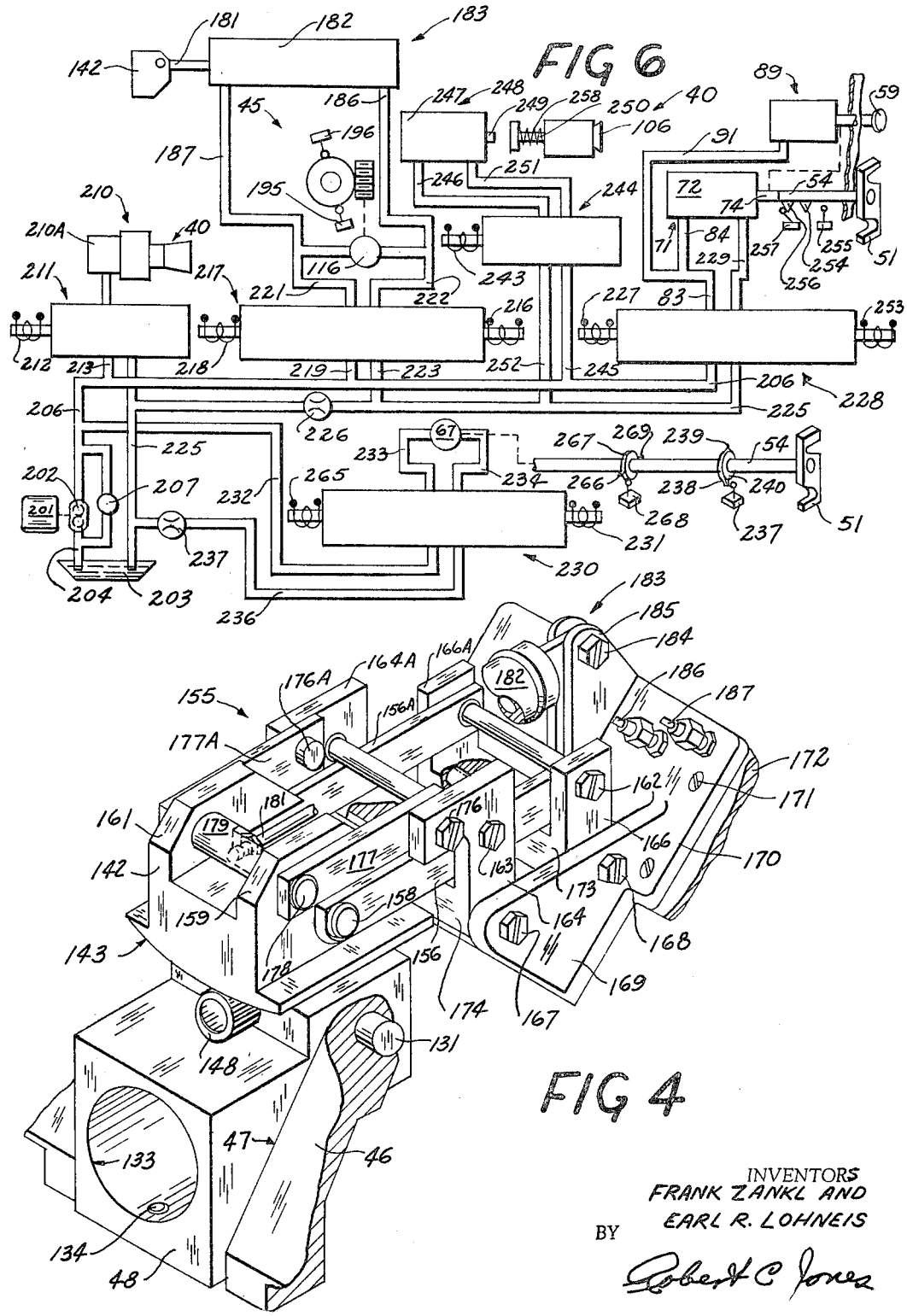

United States Patent Office 3,281,935
Patented Nov. 1, 1966

3,281,935
MACHINE TOOL WITH A TOOL CHANGER
Frank Zankl and Earl R. Lohneis, Milwaukee, Wis., assignors to Kearney & Trecker Corporation, West Allis, Wis., a corporation of Wisconsin
Original application Aug. 30, 1962, Ser. No. 220,413, now Patent No. 3,218,706, dated Nov. 23, 1965. Divided and this application Nov. 17, 1965, Ser. No. 508,208
11 Claims. (Cl. 29—568)

This patent application constitutes a division of our co-pending U.S. patent application, Serial No. 220,413, filed August 30, 1962, now Patent No. 3,218,706 and relates generally to a tool storage and tool changer mechanism for a machine tool.

It is a general object of this invention to provide a unitary tool storage and tool changer mechanism assembly adapted to be applied as a unit to a machine tool having a tool receiving spindle.

Another object of this invention is to provide a tool storage magazine with a plurality of tilting tool storage sockets for carrying tools.

A still further object is to provide an improved linkage mechanism for tilting a tool support from a storage position to a tool change position.

A still further object of this invention is to provide a tool storage magazine with a plurality of tilting tool storage supports carried in a manner that an outwardly tilted tool storage support is moved into abutting engagement with a fixed stop when in a tool change station.

A further object of this invention is to provide a tool storage magazine with a plurality of indexable tilting tool storage supports that engage a stationary guide track during indexing movement.

A still further object of this invention is to provide a machine tool structure which is adapted to operably receive an assembly incorporating tool storage means and a tool changer mechanism.

According to this invention, there is provided an improved and simplified machine tool having a column and cooperative movable elements comprising a knee, saddle and workpiece supporting table that are arranged for movement along three mutually prependicular axes for presenting a workpiece carried by the table to the tool carried by the rotatable spindle. The column is provided with a machined flat horizontal top surface which is adapted to receive a housing that can support either an indexable tool storage magazine having a plurality of stored tools and a tool changer mechanism that is carried in bodily spaced relationship relative to the storage magazine and the spindle; or, a single tool storage socket and such spaced tool changer mechanism. With either of the tool storage arrangements, the tool changer mechanism is operative to effect an interchange of tools between the storage magazine and the spindle.

The tool storage magazine of the tool storage and changer unit is mounted in an inclined plane on the upper portion of a housing member that is removably secured to a machined surface provided on the top of the machine column. The storage magazine is provided with a plurality of tilting tool storage support sockets or receptacles mounted for selective outward tilting movement in closely spaced radial guide slots formed in the periphery of the magazine drum. With this arrangement, a greater tool carrying capacity is realized due to the fact that the spacing between supports need not provide for the arcuate swing of the tool change arm in gripping a selected tool. The selected tool to be gripped is swung out of the circular array and into the arcuate path of the tool change arm. Thus, the closer spacing of adjacent tool storage supports in the circular array of storage positions does not interfere with the operation of the tool storage mechanism. The tool storage magazine is rotatably mounted in an inclined plane on a supporting housing which, in turn, is removably secured to the horizontal top surface of the machine column. The respective tilting tool storage supports of the inclined magazine are normally retained in an index position in which the longitudinal axis of each tool storage support is parallel to the axis of rotation of the magazine. The tool storage supports with tools carried therein are maintained in retracted index position by means of a guide track mounted concentrically with the axis of rotation of the magazine.

To remove a tool from any of the tilting tool storage supports, the magazine is indexed until the selected tool is adjacent the tool change station. A power actuator is thereupon energized to move a movable section of the guide track to effect a tilting of the particular support into the tool change station. In the tool change station, the longitudinal axis of the tool carried by the actuated support is disposed so as to be parallel with the longitudinal axis of the tool spindle.

The storage magazine and tool change unit may be modified to provide a single tool storage support or socket in the housing. The single stored tool socket is disposed with its longitudinal axis parallel to the axis of the tool spindle. The arrangement is such that the single stored tool is disposed in a position identical to the tool change station into which the tiltable support of a selected tool is tilted, as described in connection with the indexable magazine having the tilting tool storage support shown in FIGURE 1. The housing in which the single tool storage support is incorporated is similar to the housing on which the indexable magazine is mounted. As such, the housing is adapted to be assembled to the machine by simple being bolted on the machined horizontal top surface of the column. With this arrangeemnt, a single basic machine tool structure may be provided and will accommodate either the housing having the indexable magazine with a plurality of tilting tool storage supports, or the housing having the single tool storage support.

The foregoing and other objects of this invention, which will become more fully apparent from the following detailed description, may be achieved by the exemplifying apparatus depicted and set forth in the specification in connection with the accompanying drawings, in which:

FIG. 2 is an enlarged fragmentary view in front elevation of the tool storage and tool change unit illustrated in FIGURE 1, with a portion broken away to show the arrangement of the tilting mechanism in relation to the tool storage mechanism at the tool change station;

FIG. 3 is an enlarged transverse view of the tool storage and changer unit taken partly in vertical section and partly in elevation showing the internal operating mechanism;

FIG. 4 is a perspective view showing in detail the linkage mechanism for tilting the tool storage supports;

FIG. 5 is a fragmentary schematic plan view of the storage magazine of FIGURE 1 showing the relationship of the stationary guide track, the movable guide track section and the tiltable tool storage supports;

FIG. 6 is a schematic view of the hydraulic control circuit utlized with the machine; and, FIG. 7 is a view in front elevation of a machine tool having a modified unitary single tool storage and changer unit mounted thereon.

Figure 1:
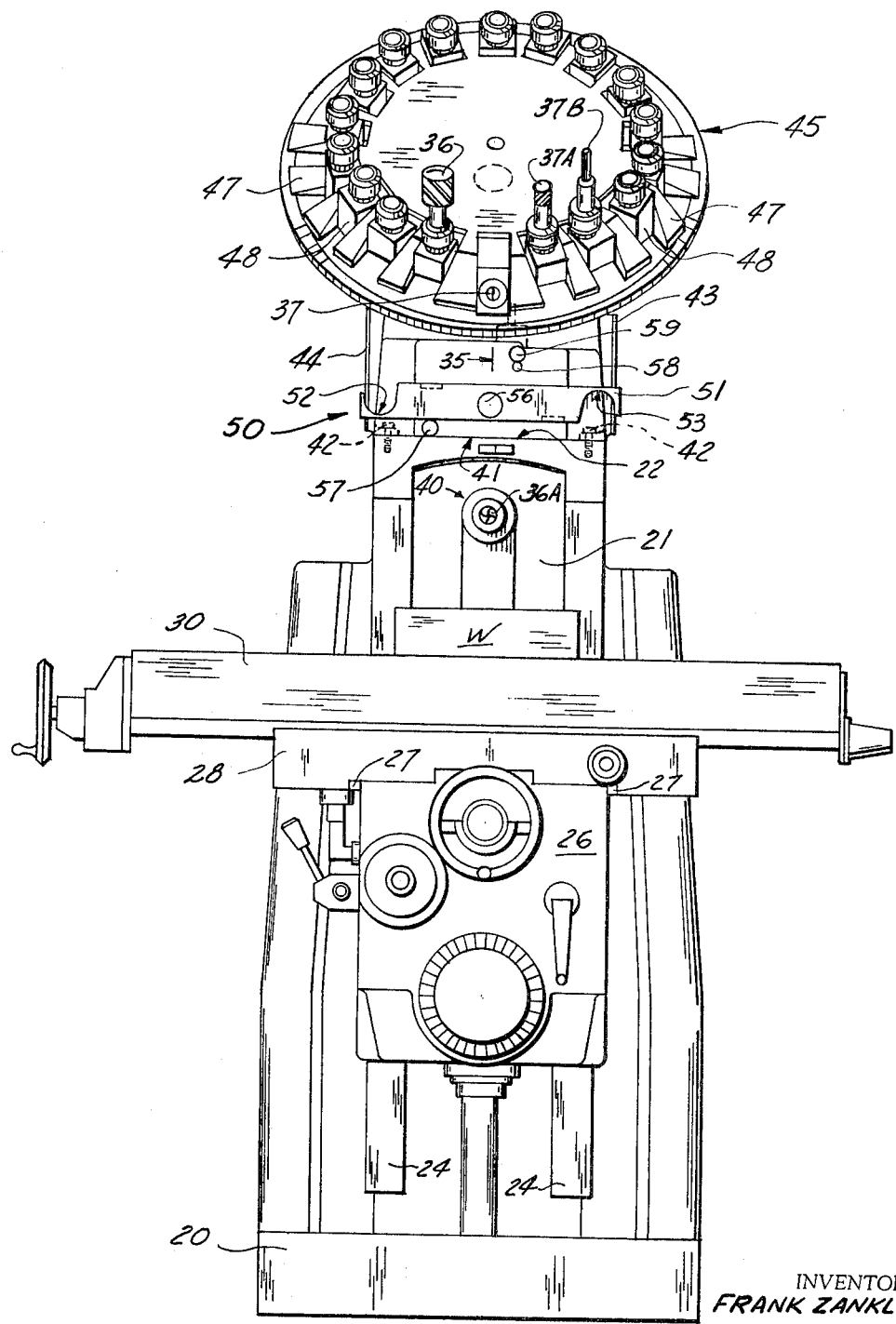
FIGURE 1 is a view in front elevation of a machine tool in which the invention herein disclosed is incorporated.

Reference is now made to the drawings and more specifically to FIGURE 1 thereof illustrating a machine tool incorporating the various features of the present invention. As there shown, the machine generally comprises a base 20 having an upstanding vertical column 21 presenting a machined upper flat surface 22 which is adapted to receive a tool storage magazine support housing 23. The column 21 is provided with vertical way surfaces 24 on which a vertically movable knee 26 is guidably supported for vertical movement therealong. Transverse guideways 27 provided on the upper surface of the knee 26 slidably support the transversely movable saddle 28 upon which is slidably carried a longitudinally movable work supporting table 30. Power operable means [not shown] disposed within the lower portion of the hollow column 21 are connected in well-known manner to effect selective relative movement of the knee 26, saddle 28 and table 30 along three mutually perpendicular axes. Thus, a workpiece W that is secured to the table surface 30 may be selectively moved relative to a cutting tool 37 operatively secured within a rotatably driven tool receiving spindle 40. The magazine support housing 23 is provided with a complementary flat machined surface 41 which is disposed in abutting relationship to the surface 22 provided on the top of the column 21 with the housing being secured in place by means of threaded bolts 42. Access to the interior of the hollow housing 23 for manipulating the bolts 42 for either securing the housing to the column or removing the housing from the column is had through access openings on either side of the housing which are closed by cover plates 43 and 44 that are secured in position by means of screws [not shown] in well-known manner. The housing 23 rotatably supports a tool storage magazine or drum 45 on the upper portion thereof in an inclined plane, as shown in FIGS. 1, 2 and 3. The storage magazine 45 is provided with a beveled periphery 46 in which a plurality of equidistanced spaced apart recesses or guideways 47 are formed. Each radially extending recess or guideway 47 is of predetermined width and is provided with a pivotable rectangular tool storage support or receptacle 48 which is adapted to carry a cutting tool.

In addition to the magazine 45, the housing 23 also carries for relative bodily movement a tool change mechanism or tool transfer device generally identified by the reference numeral 50. The tool change mechanism 50 comprises essentially a carrier or tool change arm 51 presenting semi-circular tool gripping recesses 52 and 53 at its opposite ends. The arm 51 is secured to the outer end of a shaft 54 in a bodily spaced relationship relative to the storage magazine 45 and the tool receiving spindle 40 that is rotatably mounted in the column 21. A cover plate 56 and threaded screws 57 serve to retain the arm 51 to the end of the axial movable and rotatable shaft 54. The tool receiving spindle 40, which is the operating member of the machine tool shown, is rotatably driven by power means [not shown] and releasably carries a tool, such as the tool 37 shown in FIGURE 1. To selectively limit certain rotary movements of the tool change arm 51, a pair of fixed stops 57 and 58 are secured to the housing 23 and an axially movable stop 59 is operably carried by the housing. With coordinated movements of the magazine 45, the tool change arm 51 and movable stop 59, and with the aid of fixed stops 57 and 58, tools are automatically interchanged between the storage magazine 45 and the tool operator or spindle 40.

The construction and arrangement, as well as the operation of the tool change mechanism 50 and the rotatable spindle 45, as well as the movable stop 59, is set forth in detail in the parent application Serial No. 220,413, copending herewith, and reference may be had to that application for the construction and arrangement of these elements if so desired. Essentially, the tool change arm 51, as previously mentioned, is secured to the outer end of the shaft 54, the latter being supported in the lower portion of the housing 23 with its axis being disposed in the vertical plane in which the spindle axis is located.

Rotational movement of the arm 51 in a tool changing operation is effected through the operation of the shaft 54 which has its rightward or rearward end, FIG. 3, in splined engagement in a rotatable drive sleeve 61. The drive sleeve 61 is rotatably carried in an internal hub [not shown] provided within the interior of the housing 23 and is driven by a hydraulic motor 67 schematically shown in FIG. 6.

Axial movement of the tool change arm 51 for withdrawing or inserting a tool into a tool storage holder 48 and spindle 40 is effected by means of a hydraulic power actuator 71 comprising a cylinder 72 which is operatively secured within the interior of the housing 23 and a cooperating axially movable piston rod 74, the free end of which is secured to a block 76. The block 76 has an axial bore through which the shaft 54 extends, being supported therein by means of bearings 79 and 81 that are carried within the bore. The inner race [not shown] of the bearing 79 abuts against a shoulder [not shown] formed by the reduced portion of the shaft 54 which passes through the bore of the block 76 and serves to effect axially outward movement of the shaft 54 upon leftward movement of the block 76. To provide a connection for retracting the shaft 54 for moving it rightwardly, as viewed in FIG. 3, a snap ring 82 is operatively engaged on the rod 54 to maintain the bearing 81 in operating position within the bore.

To move the carrier or tool change arm 51 and the associated shaft 54 axially outwardly, as viewed in FIG. 3, hydraulic pressure fluid is supplied to the power actuator 71 via hydraulic lines 83 and 84, FIG. 6, which operate to effect leftward movement of the piston rod 74, as viewed in FIG. 3, which is secured to the block 76 and which is operatively connected to effect axial movement of the shaft 54.

Simultaneously, with the leftward or outward movement of the tool change arm 51 and shaft 54, the movable stop 59 is also moved axially outwardly with the shaft 54 and tool change arm 51. The movable stop 59 comprises a shaft 86 which is slidably carried in a suitable bore formed in the front wall of the housing 23 and presents an integrally formed radial flange 87 that is formed on the outer end of the shaft 86. At its rightward or inner end, the shaft 86 has a reduced portion 88 that is slidably carried by a cylinder 89 which, in turn, is carried in a bored opening in the block 76. To move the shaft 86 outwardly or leftwardly, as viewed in FIG. 3, the cylinder 89 is connected via a flexible hydraulic line 91 to the hydraulic line 83 to receive hydraulic pressure fluid simultaneously with the power actuator 72. Thus, as the power actuator 72 operates to move the shaft 54 and thereby the tool change arm 51 outwardly, it also will effect the outward axial movement of the shaft 86 and thereby the stop 59. However, as the shaft 86 moves with the shaft 54, hydraulic pressure is also supplied to the cylinder 89 which thereby imparts an axial independent movement to the shaft 86 so that it will move axially relative to the shaft 54.

The extent of independent axial movement of the shaft 86 is limited by a positive stop 92 comprising a shoulder screw 93 that is arranged to extend through the end of the cylinder 89 and which is threadedly engaged in the end of the piston portion 88 of the shaft 86. Hydraulic pressure supplied to the cylinder 89 will force the shaft 86 to move axially leftwardly, as viewed in FIG. 3, but its movement is limited to the spacing that exists between the head of the shoulder screw 93 and the outer end of the cylinder 89. To retain the shaft 86 in a retracted position with the shoulder 94 in abutting engagement with the cylinder 89 whenever the cylinder is connected to drain, a spring 96 is operatively positioned around the shaft of the shoulder screw 93 and is disposed at one end in abutting engagement with the cylinder 89 while its opposite end abuts the head of the shoulder screw 93. Thus, whenever hydraulic pressure fluid is connected to actuate the power actuator 72, pressure fluid also flows via the line 91 to the cylinder 89 moving the piston 88 and shaft 86 outwardly until the flange head 87 of the shaft 86 abuts the inner face of the tool change arm 51. After the tool change arm 51 is rotated out of engagement with the movable stop 59, the continued supply of hydraulic pressure fluid to the cylinder 89 will urge the shaft 86 further leftwardly until the head of the shoulder screw 93 abuts the end of the cylinder 89. With the movable stop 59 fully extended, the tool change arm 51 will abuttingly engage the stop upon completion of 180° of rotary movement of the carrier arm 51 in the extended position.

It is therefore apparent that the positive stop operates to effect the accurate positioning location of the tool change arm so that tools carried in the grips 52 and 53 will be axially aligned with the tool storage support and the spindle 40 so that the tools carried by the arm may be easily inserted into these members.

The tool spindle 40 is rotatably carried by the column 21 in bodily spaced relationship relative to the tool change arm 51, as previously mentioned, in a manner that the axis of the spindle 40 and the longitudinal axis of either the recess 52 or 53 coincide whenever the carrier is pivoted from its horizontal parked position to a vertical tool engaging position. The spindle 40 comprises essentially an elongated tubular shaft 101 which is rotatably supported in the column 21 in well-known manner. The spindle 40 is driven by a variable speed transmission mechanism [not shown] which is selectively connectible in a well-known manner to either of spur gear 102 or 103 which are splined to the spindle shaft 101 and secured thereon by a nut 104.

To facilitate an interchange of tools, the spindle 40 is provided with an automatic collet 106 constituting a selectively releasable tool clamping means. The collet 106 comprises an inner cylindrical hub guided for limited axial movement within an enlarged bore 107 formed in the spindle shaft 101. The hub of the collet 106 is integrally formed with a plurality of the forwardly extending resiliently expansible gripping segments 108 which are disposed in operative position within a tapered opening 109 formed in the spindle shaft 101. Axial inward movement of the collet 106 operates to engage the resilient segment 108 within the tapered opening 109 of the spindle thereby moving the resilient portions 108 into tight engagement with the shank of a tool. On the other hand, the outward movement of the collet 106 will serve to move the resilient segment portions 108 thereof axially leftward relative to the tapered bore 109, as viewed in FIG. 3, thereby releasing the tool so that the tool may be freely withdrawn from the collet. Axial movement of the collet 106 in either direction in a tool clamping or releasing action is accomplished by means of an axially movable rod 110 which is secured in the hub portion of the collet 106, as schematically shown in FIG. 6.

To position a tool for an interchange with a tool carried by the spindle 40, the tool storage drum 45 is rotatably carried by a shaft 115, which is driven by a hydraulic motor 116, shown in FIG. 3, that is mounted on a frame portion 117 of the housing 23. The shaft 115 is rotatably mounted in bearings 118 and 119 and extends through a bored opening 120 of an axial boss 121 integrally formed with the drum bolt 45. Bolts 122 extend through the boss 121 and threadedly engage in an annular flange 123 formed on the shaft 115 to secure the drum in operating position on the shaft. As previously mentioned, the periphery on the drum 45 is provided with a plurality of radial slots or guideways 47 integrally formed therein in radial spaced relationship. Each slot or guideway 47 is of a predetermined width and is provided with a pivotal rectangular tool storage support or receptacle 48 for carrying a tool. In addition to carrying a tool storage support, the spaced parallel sides of each radial slot or guideway 47 serves to guide the tool storage support 48 for pivotal movement. Inasmuch as each rectangular tool storage support and each cooperating guideway is identical with all the other pivotal tool storage supports and guideways presented by the drum, it is deemed sufficient to describe in detail only a single tool storage support or receptacle and guideway.

Each tool storage support or receptacle 48 comprises a rectangular block pivotally supported in its respective slot 47 by means of a pin 131 having its opposite end mounted in the drum 45 and projecting through a bored opening presented by a shoulder 132 integrally formed with the tool storage support 48, as shown in FIGS. 2 and 4. To carry a tool, the receptacle 48 is provided with a bored opening 133 which has its longitudinal axis normally parallel to the axis of drum rotation, and perpendicular to the axis of rotation of the tool storage support or receptacle 48 about the pin 131. A detent mechanism 134 is provided with each tool storage support and includes a spring biased ball that is adapted to extend radially into the bore 133 to engage a cooperating annular groove 135 presented by the tool, as shown in FIG. 3, to thereby releasably retain a tool in the tool storage support 48.

Inasmuch as each tool storage support 48 is pivotable outwardly about its cooperating pivot pin 131, it is necessary to maintain all of the supporting blocks in upright index position and parallel to the axis of drum rotation during indexable tool selection movement of the drum. To this end, the radially slotted tool carrying storage drum 45 is provided with a hollow central portion within which is supported a concentrically disposed circular stationary main tool guide track or fixed ring 140 which presents a peripheral roller guideway 141. At the tool change station 35, the main guide track 140 is interrupted to present a peripheral opening for receiving a radially movable track section 142 which is provided with a roller surface 143 thereon. When the tool storage supports or receptacles 48 are all in retracted index position, the movable track section 142 will be retracted and will present its roller surface 143 in annular alignment with the roller surface 141 of the main trackway so that, in effect, there is one continuous roller surface for the tool supporting sockets to roll upon, as schematically shown in FIG. 5. However, when a tool which has been selected is located in the tool change station, the pivotal or movable track section 142 will be caused to be moved radially outwardly thereby effecting the pivotable movement of the tool storage support or receptacle 48 about the pin 131 so that the tool is projected in the arcuate path of the tool change arm 51. Both the stationary main tool guide track 140 and the movable track section 142 are disposed coaxially about a hub 139 in which the drum shaft 115 is supported and is secured to the central frame 117 by bolts 144, one of which is shown in FIG. 3. During indexable tool selecting movement of the magazine 45, the movable track section 142 is in a retracted position, as shown in FIG. 3, in a manner that the arcuate outer roller surface 143 presented thereby coacts with the outer roller surface 141 presented by the main track section 140 to provide a continuous peripheral roller surface, as shown in FIG. 5. The continuous peripheral roller surface, as formed by the roller surfaces 141 and 143 of the main track section 140 and movable track section 142 respectively, extends through a full 360°, and is parallel to the axis of rotation of the storage drum 45. To provide an operative connection between the tool storage support or receptacle 48, and the continuous peripheral surface presented by the coacting roller surfaces 141 and 143, the tool storage support 48 is provided with a pair of guide rollers 148 and 149 that are rotatably secured to the shoulder 132, as shown in FIGS. 3 and 4. The guide rollers 148 and 149 are supported by the shoulder 132 for rotation about an axis which is disposed transversely of the pivot pin 131 about which the tool storage support 48 pivots with the rollers 148 and 149 being disposed on opposite sides of the pin. With the tool storage support 48 in retracted position, the rollers 148 and 149 associated therewith are journaled to rotate about an axis that is disposed parallel to the axis of drum rotation and perpendicular to the axis of the pivot pin 131 about which the associated tool storage support 48 is journaled. Therefore, during indexable movement of the drum 45, the tool storage support 48 is guided along the continuous peripheral guide surface by the rollers 148 and 149, as shown in FIG. 3, maintaining the longitudinal axis of the tool storage support 48 parallel with the axis of drum rotation. The tools are normally carried in a retracted position, i.e., with the longitudinal axes of the tool storage supports 48 parallel with the axis of drum rotation which, for the sake of clarity in this description, is identified as the index position for the tools. Thus, even though the drum 45 is stationary, all tools are held in their index position, and this is true of the particular tool storage support that may be located in the tool change station 35. This is true, because the rollers 148 and 149 associated with each tool storage support 48 are spaced apart sufficiently far enough from each other and are maintained in rolling engagement with the trackway surface. Therefore, any tendency of a tool, such as the tool 37 carried by the support 48, shown in FIG. 3, to effect a pivotal movement of the associated support in a counterclockwise direction as viewed in FIG. 3, is resisted by the roller 149 which is firmly engaged with the surface 143 of the pivotal track section 142. It is therefore apparent that the particular tool storage support 48 located at the tool change station 35 cannot be pivoted outward into a tool change position until such time as the pivotal track section 142 is moved radially outwardly and downwardly.

In addition to guiding the tool storage supports 48 during indexing movement of the drum, the radially movable track section 142 is also operable to pivot a tool storage support 48 that is located in the tool change station 35 from the index position to an outwardly disposed tool change position, as shown in FIGS. 1 and 2, and in broken lines in FIG. 3. To accomplish this, the track section 142 is carried for radial outward movement in substantially spaced parallelism with respect to the axis of the tool storage support 48. When in the tool change position at the tool change station 35, the longitudinal axis of the tool storage support 48 is parallel with the longitudinal axis of the spindle 40 and positioned in vertical alignment with the spindle 40 and the axis of rotation of the arm 51. Thus, a tool storage support 48 is indexably advanced by rotation of the storage drum 45 to an indexed position at the tool change station 35 in substantial radial alignment with the radially movable track section 142. To move the tool storage support 48 from the index position to the tool change position in the tool change station 35 for subsequent removal of a tool from the tool storage support, the tool storage support 48 is pivoted radially outward about its pivot pin 131. As viewed in FIGS. 2 and 3, the movable track section 142 is located adjacent to the tool change station 35 in order to pivot the tool storage support 48 outwardly to the tool change position. Further, as shown in FIG. 2, the movable track section 142 is displaced to the left of a vertical plane which passes through the spindle 40, shaft 54 and tool storage support 48. The movable track section 142 is offset to the left of such vertical plane in order to provide timed coaction of the tilting tool storage support 48 with the clockwise indexing movement of the drum 45 and the counterclockwise rotational positioning movement of the drum for positioning a tool into tool change position at the tool change station. To pivot the tool storage support 48 for locating the tool carried therein in a tool change position while still retaining the rollers 148 and 149 in contact with the guide surface 143 of the movable track section 142, the movable track section is moved rectilinearly as well as arcuately about the pivot pin 131 in a radially outward direction.

With the movable track section 142 in a retracted position, as shown in full lines in FIG. 3, it will be apparent that the outer roller surface 143 thereof is perpendicular to an imaginary radial line constructed to intersect the rotational axis provided by the pivot pin 131 about which the tool storage support 48 is pivotable. With the tool storage support 48 pivoted outwardly about the axis of the pin 131, to the horizontal tool change position depicted in FIGS. 2 and 4, and also indicated by broken lines in FIG. 3, the above-mentioned imaginary radial line, constructed perpendicular to the guide surface 143 of the track section, will be in identical perpendicular relationship to the outer face or roller surface 143 of the pivotal track section 142. Thus, it is apparent that irrespective of the direction of pivotal movement of the tool storage support 48 about its pin 131, the guide rollers 148 and 149 rotatably carried thereby are maintained in continuous guiding engagement with the roller surface 143 of the movable track section 142. In this manner, a tool carried by the tool storage support 48 will be accurately located in a tool change position so that the grip 52 of the tool change arm 51 may easily engage the periphery of the presented tool upon rotation of the arm 51 in a clockwise direction. With the positive engagement maintained between the guide rollers 148 and 149 and the guide surfaces 143 of the movable track section 142, a minimum of looseness or play will exist in each of the tool storage supports or receptacles 48 as they are moved in an indexing movement.

To achieve this result, the pivotal or movable track section 142 is urged outwardly or to the left from the position it occupies in FIG. 3 to assume a horizontal tool clamp position as depicted in FIG. 4 and indicated by broken lines in FIG. 3. In accomplishing this positioning movement of the movable track section, the track section 142 moves bodily in an arcuate path around the axis of the pin 131. As a result of this bodily arcuate movement of the movable track section 142, the outer arcuate roller surface 143 thereof continuously engages the rollers 148 and 149 of the tool storage support 48 causing the tool storage support to pivot about the axis of the pin 131. This movement of the movable track section 142 and the resultant pivotal movement of the tool storage support 48 continues until the under surface of the tool storage support 48 engages an adjustable positive stop comprising a set screw 151 threaded into a lower integrally formed stirrup bar 152 shown in FIG. 3. When the tool storage support 48 engages the set screw 151, the tool carried by the support will be located in a tool change position wherein its axis is disposed in a horizontal plane and the tool projects into the arcuate path of travel of the tool change arm 51 so that the grips of the arms may firmly engage with the tool.

To effect the required bodily movement of the movable track section 142 there is provided a novel extensible linkage mechanism 155, shown in FIG. 4, and comprising a plurality of spaced, pivotally intersecting links that are disposed in symmetrically spaced identical pairs, such as the pair of links 156 and 156A. At their forward ends, the links 156 and 156A are pivotably secured by a pivot shaft 158 to the opposite outer vertical faces of inwardly projecting flanges 159 and 161 integrally formed with the movable track section 142. The shaft 158 constitutes the pivot axis about which the movable track section 142 pivots, while the shaft itself moves bodily about the axis of the shaft 131. It is apparent, therefore, that since the track section 142 pivots about the shaft 158, it will also move bodily about the axis of the shaft 131. In this manner, the movement of the track section 142 will cause the tool storage support 48 to pivot about its axis 131 to move the tool storage support 48 from the retracted index position, shown in full lines in FIG. 3, to the horizontal tool change position, depicted in FIG. 4 and indicated by broken lines in FIG. 3. In doing so, the control contact between the guide rollers 148 and 149 associated with the storage support 48 do not lose contact with the guide surface 143 of the movable track section so that the pivotal movement of the support is always under complete control and is never permitted to fall into the tool change position. It is also apparent that the bodily movement of the track section 142 about the shaft 131 operates to retain the contact relationship between the rollers 148 and 149 and the guide surface 143, and this relationship is maintained throughout the pivotal movement of the support 48 so that no sliding between the rollers and the guide surface occurs. As a result, no wear occurs on the roller surfaces, nor on the arcuate guide surface 143 of the track section 142, so no flat spots are developed on these surfaces.

Since all the linkages in the link mechanism 155 are arranged in pairs and each pair of linkages operates in synchronism, only one link of each pair of linkages will hereinafter be described to facilitate the description.

Rearwardly of the shaft 158, the link 156 is pivotally secured by bolts 162 and 163 to parallel spaced apart movable support links 164 and 166. The support links 164 and 166, in turn, are pivotally secured by means of bolts 167 and 168 to a vertically upstanding flange 169 that is integrally formed with a linkage support bracket 170. The support bracket 170 is secured by screws 171 to a depending base section 172 that is integrally formed with the support base 145 on which the main track section 140 is integrally formed. For maintaining the entire linkage mechanism 155 in synchronism, the rearward link 166 and a mated companion link 166A are integrally formed with a transverse bar 173 so that the structure comprises, in effect, a single unitary U-shaped member. In a like manner, the link 164 and a mated companion link 164A are formed with an integrally transverse bar 174 to comprise a single unitary U-shaped member.

At their upper end, the links 164 and 164A are provided with integrally formed lateral forward extending arms that are pivotally connected by means of bolts 176 and 176A to the rearward extending ends of tilt control links 177 and 177A, as shown in FIG. 4. The forward extending ends of each of the control links 177 and 177A are pivotally connected to the extending ends of a shaft 178 that extends through suitable bored holes in the inwardly extending track section flanges 159 and 161. Between the flanges 159 and 161, the shaft 178 carries a freely movable collar or sleeve 179 that is secured to the outer end of a piston rod 181 which is axially movable by the operation of the piston [not shown] that is reciprocable within a cylinder 182 which constitutes a power actuator 183 for effecting the pivotal tilting movement of the tool storage support 48. The opposite end of the cylinder 182 is pivotally secured by a bolt 184 to spaced apart vertical flanges 185 that are integrally formed with a linkage support bracket 170.

For operating the power actuator 183 to move a tool storage support 48 from a retracted index position to the tool change position, hydraulic pressure fluid is supplied to the power actuator cylinder 182 via a connecting line 186, while a line 187, having one end connected to the opposite end of the cylinder as depicted in FIG. 3, is connected to drain. Conversely, to return the tool storage support 48 from the tool change position, that it occupies in FIG. 4, to the retracted index position shown in full lines in FIG. 3, pressure fluid is supplied to the cylinder via the line 187 while the line 186 is simultaneously connected to drain.

In addition to supporting a tool in the index position, as well as in the tool change position, the tool storage support 48 functions as a movable stop limiting counterclockwise movement of the drum 45 to effect the final positioning of the tool storage support in the tool change station. To this end, when the drum 45 is rotated in a clockwise direction, as viewed in FIGURE 1 in a tool selecting movement, the selection of a tool will cause the drum 45 to stop rotating but its position will be such that the tool storage support in which the desired tool is stored will be slightly to the left of a vertical plane which passes through the tool change station 35, the axis about which the tool change arm rotates, and the axis of rotation of the spindle 40. The drum 45 will then be operated in a reversed or counterclockwise direction and, at the same time, the tool storage support 48 in which the selected tool is stored will be pivoted outwardly from the index position to a horizontal position, as depicted in FIGURE 1. With the tool storage support 48 in a tilted outward tool change position and with the tool drum 45 rotating in a clockwise direction, the outwardly tilted tool support will be disposed so as to engage with a positive stop 190 that is fixedly secured to the housing 23. It is apparent, therefore, that counterclockwise rotation of the drum 45 for effecting final positioning of the outwardly tilted tool storage support 48 will move one side of the tool storage support into abutting engagement with the fixed positive stop 190, as shown in FIGS. 1 and 2, terminating the counterclockwise rotation of the drum 45. It is emphasized, however, that the tool storage support 48 is only in a line of interference with the fixed positive stop 190 when it is in the tilted outward tool change position. Therefore, when the tool storage support 48 is in the retracted or index position it will pass the fixed stop 190 irrespective of direction of drum rotation. It will be understood, that during the primary indexing movement of the storage drum 45, the next selected tool is moved beyond the positive stop 190 in a clockwise direction; the tool storage support 48 is then tilted outwardly; and, the drum rotation reversed to urge the outwardly tilted tool storage support into abutting engagement with the positive stop 190 so that the selected tool carried by the outwardly tilted tool storage support 48 will be accurately located in the tool change station and in position to be engaged by a tool grip on the tool change arm 51.

The operation of the tool change magazine 45 is set forth in detail in the aforementioned co-pending parent U.S. application, Serial No. 220,413. Generally, the drum 45 is rotatably driven in a clockwise direction, as viewed in FIGURE 1, for indexing the drum to begin a machining cycle, as well as for advancing subsequent tools to the tool change station after a machining cycle is begun. At the beginning of a machining cycle, the initial clockwise rotation of the drum 45 operates to position a first code identified tool to be used in the machining cycle adjacent the tool change station 35. To this end, the code identified tool is provided with a slightly longer shank and extends downwardly through the bore of the tool storage support 48 a sufficient distance to actuate a limit switch 195 to indicate the beginning of the machining cycle and condition the control circuit for subsequently moving that tool into the tool change station. As the first tool or coded tool actuates the limit switch 195, the drum will continue to be driven in a clockwise direction a distance sufficiently far enough until a guide roller 149 associated with a different angularly spaced apart tool storage support 48 actuates a sequence control limit switch 196 which is carried by a mounting block 197 that is secured to an inclined web portion 198, as shown in FIG. 3. The reversing control limit switch 196 is disposed substantially 180° from the tool change station in a position to be actuated by a roller 149 of a support at the time that the particular storage support with the selected tool or first tool has been rotated in a clockwise direction past the tool change station. Therefore, with the particular tool storage support 48 a slight distance to the left of the tool change station 35, as viewed in FIGURE 1, the limit switch 196 will be actuated to cause the magazine 45 to be rotated in a reverse or counterclockwise direction, as viewed in FIGURE 1. The limit switch 196, upon being actuated, operates to effect the operation of the power actuator 183 which effects the pivotal movement of the tool storage support 48 carrying the first tool in the machining cycle into the tool change station as the drum begins to rotate in a counterclockwise direction. In other words, counterclockwise or reverse movement of the drum 45 and the energization of the actuator 183 occurs simultaneously so that the drum is moved in a reverse direction and, at the same time, the movable track section 142 will be moved outwardly and downwardly about the axis of the shaft 131 so that the tool storage support 48 carrying the first tool 37A is also pivoting about the axis of the shaft 131. This movement of the tool storage support from the index position into a tool change position will be completed prior to the time that the tool storage support is actually located in the tool change station so that the continued counterclockwise or reverse movement of the drum will cause the side of the tool storage support that is now tilted forwardly or outwardly to engage the positive stop 190 and thus effect final precise positioning of the tool storage support in a tool change position at the tool change station 35.

The hydraulic circuit for supplying operating pressure to control the operation of the machine tool is schematically shown in FIG. 6. As there shown, an electric motor 201 is connected to drive a hydraulic pump 202 to withdraw fluid from a sump 203 through a line 204 and discharge the fluid under pressure into a main supply line 206. A pressure relief valve 207 is connected in parallel with the pump 202 to the lines 204 and 206 to maintain a predetermined pressure in the hydraulic circuit.

The function of the hydraulic circuit is best illustrated in conjunction with a tool interchange cycle of operation. It will be assumed that the first code tool 37 of the group of tools 37, 37A and 37B that are to be used in a particular machining cycle is to be moved into the tool change station 35. It will also be assumed that the spindle 40 with the last tool 36A of a previous group of tools, namely, 36 and 36A, is performing a final work operation on a workpiece for completing a cycle of machining operations which are entirely different than the operations which will be performed on a different workpiece with the group of tools 37, 37A and 37B.

When the last machining operation has been completed with the tool 36A, a signal calling for a change of tools, initiated either manually or from a programmed source, is obtained to thereupon effect the deactuation of a spindle drive clutch [not shown] in a well-known manner to interrupt the power drive to the spindle 40 and to actuate the spindle brake 210, shown schematically in FIG. 6, to stop spindle rotation. The spindle brake 210 operates under the control of a solenoid actuated valve 211 which is actuated by a solenoid 212 energized by the signal that calls for a change of tools. Energization of the solenoid 212 actuates the valve 211 so that it operates to direct pressure fluid in the main supply line 206 and a connecting branch line 213 into a connected line 214 that is in communication with the hydraulic actuator 210A that is associated with the spindle brake 210. Pressure fluid supplied to the actuator 210A will effect the operation of the brake mechanism 210 to stop the rotation of the spindle 40.

After the spindle 40 has been braked to a stop, a solenoid 216 associated with a control valve 217 is deenergized, and simultaneously therewith, an associated solenoid 218 is energized. This will effect the operation of the motor 116 in a direction to move the magazine 45 in a clockwise direction for moving the first tool 37 into the tool change station 35, and simultaneously therewith, for effecting the retracting movement of the tool storage support 48 in which the tool 36 is stored and which is presently located at the tool change station. To this end, the energized solenoid 218 actuates the valve 220 and it operates to direct pressure fluid from the main supply line 206 and a connected branch line 219 into a line 221 that is connected to an inlet port of the motor 116. Pressure fluid supplied to the motor 116 via line 221 will effect the operation of the motor in a direction to urge the drum 45 in a clockwise direction. Simultaneously, pressure fluid will flow from the line 221 into the connected line 187 and thence into the rod end of the cylinder 182 to effect the tilting movement of the tool storage support 48 in which the tool 36 is stored into a retracted index position. As pressure fluid is supplied to the motor 116 via the line 221, exhaust fluid will flow from the motor into a connected line 222 through the valve 217 into a connected line 223 that is in communication with a main return line 225 leading to the reservoir 203. The rate of flow of exhaust fluid flowing into the return line 225 from all hydraulically operated units, except the spindle brake 210 and the motor 67, is controlled by an adjustable flow control valve 226 that is interconnected in the line 225. Since the hydraulic actuator 183 has been energized to effect the retraction movement of the tool storage support 48, exhaust fluid from the right end of the cylinder 182, as viewed in FIG. 6, will flow into the connected line 186 that is in communication with the line 222. Thus, the exhaust fluid from the actuator 183 combines with the exhaust fluid from the motor 116 and is returned to the reservoir 203 as previously described.

As the magazine 45 is rotated in a clockwise direction, the first tool 37 of the group of tools 37, 37A and 37B, is a code tool and it will actuate a limit switch 195 shown in FIGS. 2 and 3. Only the first or code tool will actuate the limit switch 195 because it is provided with a shank extension 136 that is removably attached to the inner end of the tool as depicted in FIG. 3. With the extension 136 attached to the first tool 37, the shank of the tool extends inwardly sufficiently far so that it will engage the actuating arm of the limit switch 195 to actuate the switch as the tool moves with the drum 45 in a clokwise direction. As shown in FIGS. 2 and 3, the limit switch 195 is carried by the guideway supporting base 145 and is located to the right of the tool change station 35, as depicted in FIG. 2. However, prior to the code tool 37 actuating the limit switch 195, a roller 149 associated with a storage support 48, which is located diametrically opposite the support in which the tool 37 is stored, will actuate and release the limit switch 196. This prior actuation and deactuation of the switch 196 conditions the controls for subsequent operation. The drum 45 continues to rotate in clockwise direction and the code tool 37 passes the switch 195, actuating and deactuating the switch. Drum rotation will continue in a clockwise direction, moving the tool 37 to the left of the tool change station 35, as viewed from the front of the machine. As the drum 45 continues to rotate in a clockwise direction, the roller 149 associated with the support that is immediately to the left of the support which is located diametrically opposite the support in which the tool 37 is stored, will actuate the limit switch 196 again, and drum rotation in a clockwise direction is stopped. To this end, when this condition is obtained, i.e., with the limit switch 196 actuated twice and with the intervening actuation of the limit switch 195, the solenoid 218 ascociated with the control valve 217 is deenergized. This will actuate the control valve 217 so that it operates to interrupt the flow of pressure fluid to the motor 116 stopping the clockwise rotation of the drum 45. Simultaneous with the deenergization of the solenoid 218, the associated solenoid 216 is energized to operate the valve to direct pressure fluid to the motor 116 to operate it in a reverse direction for rotating the drum 45 in a counterclockwise direction.

At the same time, pressure fluid will flow into the line 186 and thence into the right end of the cylinder 182 of the actuator 183. This will cause the actuator 183 to operate to move the movable track section 142 outwardly thereby effecting the pivotal movement of the tool storage support 48 in which the first tool 37 is stored outwardly from an index position into a horizontal tool change position. Thus, the counterclockwise rotation of the magazine 45 and the outward pivotal movement of the tool storage support 48 occurs simultaneously. The counterclockwise rotation of the drum 45 continues until the outwardly pivoted support 48, in which the tool 37 is stored, engages the positive stop 190 to terminate the counterclockwise rotation of the drum and to position the first tool 37 in the tool change station. However, at this time, pressure fluid will be continued to be supplied to the motor 116 so that it operates to continuously urge the magazine 45 in a counterclockwise direction thereby positively holding the magazine against the positive stop 190. With the first tool 37 positioned in a tool change position at the tool change station, after a slight timed delay, a solenoid 227 associated with a control valve 228 is energized to effect the operation of the valve for directing pressure fluid to the actuator 71 for positively retaining the tool change arm 51 in the retracted position prior to a tool change operation. With the solenoid 227 energized, the valve 228 is actuated and operates to direct pressure fluid from the supply line 206 into a connected line 229 that communicates with the rod end of the cylinder 72. Pressure fluid supplied to the rod end of the cylinder 72 will maintain the rod 74 associated with the actuator 71 in a retracted position so that the tool change arm shaft 54 and the shaft 86 associated with the movable stop 59 are retained in retracted position. With pressure fluid being supplied to the rod end of the cylinder 72, the left end of the cylinder is connected to drain via the interconnected lines 84 and 83 which, by operation of valve 228, communicate with the main return line 225. Simultaneous therewith, the cylinder 89 associated with the movable stop 59 is also connected to drain via a connecting line 91 that communicates with the line 83.

Simultaneously with the energization of the solenoid 227 associated with the valve 228, a solenoid 231 associated with a control valve 230 is energized to effect the clockwise rotary movement of the tool change arm 51 so that the arm will be moved from the horizontal parked position to a vertical tool engaging position. This movement of the arm 51 is effected by the energization of the solenoid 231 which effects the actuation of the control valve 230 so that the valve operates to direct pressure fluid obtained from the supply line 206 and a connected branch supply line 232 into a line 233 that is in communication with an inlet port of the motor 67. The pressure fluid supplied to the motor 67 via the line 233 will effect the operation of the motor for rotating the tool change arm 51 in a clockwise direction, as viewed in FIGURE 1, to move the arm from its horizontal parked position into a vertical tool engaging position. As the motor 67 operates to effect the rotation of the arm in a clockwise direction, exhaust fluid from the motor 67 will flow into a connected line 234 and will be directed by the valve 230 into a branch return line 236, with the exhaust fluid flowing through a flow control valve 237 that is adjustable so as to vary the rate of discharge therethrough so that a predetermined rate of rotary movement of the arm 51 may be established as desired.

When the tool change arm 51 has rotated to a vertical position, wherein it has grasped the tool 37 and the tool 36A, a limit switch 237, shown in FIG. 3 and schematically in FIG. 6, will be actuated. Actuation of the limit switch 237 is accomplished by means of a cam 238 or a cam 239 carried in diametrically opposite relationship on the peripheral surface of a cam disc 240 which is secured on the shaft drive sleeve 61 for rotation therewith. The limit switch 237 is arranged to be actuated by either the cam 238 or on alternate cycles of rotation by the cam 239. Thus, in the initial rotation of the arm 51 from a parked position to a vertical tool engaging position, the cam 238 will actuate the limit switch 237. It will be noted that only one cam actuates the limit switch 237 during one interchange cycle of operation and the other cam, spaced 180° apart therefrom, actuates the switch during an alternate cycle.

Thus, when the arm 51 is in a vertical position, the limit switch 237 will be actuated by either the cam 238 or the cam 239 to maintain the solenoid 216 associated with the valve 217 energized so that the outwardly tilted tool storage support 48, in which the tool 37 is stored, is maintained against the positive stop 190. The actuated limit switch 237 also effects the deenergization of the solenoid 227 so that the control valve 228 is actuated into a neutral position for subsequent operation. The actuated limit switch 237 further operates to effect the energization of a solenoid 243 associated with a control valve 244 to actuate the valve so that it operates the direct pressure fluid from the supply line 206 via an interconnecting line 245 into a connected line 246 that communicates with the left end of a cylinder 247 of a collet actuator 248. With the cylinder 247 supplied with pressure fluid via the line 246, a rod 249 is moved outwardly of the cylinder to the right, as viewed in FIG. 6, into engagement with the actuating rod 250 that is connected to the collet 106. The rightward movement of the collet rod 250 will actuate the collet 106 so that the resilient segments 108 of the collet are released from tool clamping engagement. Thus, the tool 36A, which is presently in the spindle 40, is released so that it may be withdrawn from the spindle. As the actuator 248 is operated to effect the unclamping of the collet, the rod end of the cylinder 247 is connected to the return line 225 via the interconnected lines 251 and 252.

The actuated limit switch 237 also operates to effect the energization of a solenoild 253 associated with the control valve 228 to effect the actuation of the valve so that it operates to direct pressure fluid from the supply line 206 into the interconnected lines 83 and 84 to supply the left end of the cylinder 72, as viewed in FIG. 6, with pressure fluid. Pressure fluid supplied to the left end of the cylinder 72 will effect the operation of the actuator 71 to move the rod 74 associated with the cylinder outwardly to the right, as viewed in FIG. 6, or to the left, as viewed in FIG. 3. This outward movement of the rod 74 effects the simultaneous outward or leftward movement, as viewed in FIG. 3, of the arm shaft 54 and movable stop shaft 86. Thus, the tool change arm 51 is moved outwardly away from the front face of the machine tool withdrawing the tool 37 from the tool storage support 48 located at the tool change position and to withdraw the tool 36A from the spindle 40. At this time, the exhaust fluid from the right rod end of the cylinder 72 passes into the connected line 229 which is connected to the reservoir by operation of the valve 228.

As pressure fluid is being supplied to the left end of the actuator 71, the pressure fluid in the line 83 will also flow into the connected line 91 and be directed thereby into the cylinder 89 to act on the reduced piston portion 88 of the rod 86 to bias the rod 86 outwardly or to the left, as viewed in FIG. 3. As previously described, the hydraulic pressure supplied to the cylinder 89 will condition the shaft 86 for further leftward movement after the arm 51 has been rotated in a clockwise direction from a vertical extended position to release the stop 59. When this occurs, the rod 86 will move an additional amount to the left, as viewed in FIG. 3, so that the head 87 extends into the path of rotation of the arm 51 for subsequent engagement by the arm.

When the arm 51 is in fully extended position, a cam 254 secured to the block 76 is moved into position to engage the actuating arm of the limit switch 255. Actuation of the limit switch 255 effects the energization of the solenoid 231 associated with the control valve 230 to actuate the valve so that it operates to direct pressure fluid from the branch supply line 232 through the valve into the connected line 233 for supplying the hydraulic motor 67 with pressure fluid to cause it to operate in a direction to effect a 180° of rotational movement of the arm 51 in a clockwise direction, as veiwed from the front of the machine tool, from the vertical position that it occupies as depicted in FIG. 3. The carrier arm 51 wtih the two tools 37 and 36A in the grips 52 and 53, respectively, will rotate 180° in a clockwise direction until the arm abuts the extended movable stop 59 wherein the flanged head 87 of the stop will intermeshingly engage a slot 256 that is formed in the side of the arm 51 adjacent to the grip 53. The engagement of the arm 51 with the movable stop 59 will stop the rotary movement of the arm 51. Thus, the position of the two tools 37 and 36A have been interchanged so that the tool 37 in the grip 52 is now axially aligned with the spindle 40 while the last tool 36A, of the previous group of tools that is carried by the arm grip 53, is axially aligned for insertion into the outwardly pivoted tool storage support 48 that is located in the tool change station 35 in which the tool 37 was stored. With the arm 51 positioned 180° into a tool interchange position, the limit switch 237 is again actuated by one or the other of the cams 238 or 239 to effect the next step in the tool change cycle of operation.

To retract the carrier arm 51 for inserting the tool 37 into the spindle 40 and tool 36A into the tool storage support 48, the solenoid 227 associated with the control valve 228 is energized while the solenoid 253 associated with the valve is simultaneously deenergized. The energization and deenergization of the solenoids 227 and 253, respectively, is effected upon the actuation of the limit switch 237 which is accomplished at the end of the 180° rotation of the arm 51. Energization of the solenoid 227 will actuate the valve 228 so that the valve operates to direct pressure fluid into the line 229 which is connected to the rod end of the cylinder 72. The actuator 71 is thereupon operated to effect a retraction of the arm 51. As pressure fluid is supplied to the rod end of the cylinder 72, the left end of the cylinder is connected to drain via the lines 84 and 83, and simultaneously therewith, the cylinder 89 is also connected to drain via the line 91 that is connected to the line 83. Thus, the combined exhaust fluid from the left end of the cylinder 72 and from the cylinder 89 is directed by the valve 227 into the return line 225.

As the actuator 71 is operated to effect inward movement of the arm 51, the cam 254 carried by the block 76 is moved out of engagement with the actuating arm of the limit switch 255. This merely conditions the limit switch for subsequent actuation in the next sequence of operation. When the arm 51 is fully retracted, a cam 256 secured to the block 76 is moved into engagement with the actuating arm of a limit switch 257 to actuate the limit switch. Actuation of the limit switch 257 effects the deenergization of the solenoid 243 associated with the collet control valve 244 to actuate the valve into its normal operating position. With the valve 244 in its normal operating position, pressure fluid from the supply line 206 and the connected line 245 is directed into the connected line 251 that is in communication with the rod end of the cylinder 247. This will effect the operation of the actuator 248 to move the associated rod 249 inwardly to disengage it from the collet actuating rod 250. The collet actuating rod is thereby released and a spring 258 that is associated with the rod 250 urges the rod in a leftwardly direction, as viewed in FIG. 6, so that the resilient elements 108 of the collet are tightly engaged with the shank of the tool 37 now within the spindle 40 to firmly clamp the tool in operating position in the spindle. Exhaust fluid from the left end of the cylinder 247 is directed to drain via the line 241, the valve 238 and the connecting drain line 252.

The actuation of the limit switch 262 also effects counterclockwise rotation of the carrier arm 51 to disengage the carrier arm from the tools and rotate it in a counterclockwise direction from a vertical position to a horizontal parked position. During the counterclockwise rotation of the arm 51, the solenoid 227 associated with the valve 228 is retained energized to maintain the carrier arm 51 in a retracted position while it is being rotated to the parked position.

To rotate the carrier arm 51 90° in a counterclockwise direction from a vertical position to a horizontal parked position, the actuated limit switch 257 is connected to effect the deenergization of the solenoid 231 and simultaneously therewith to effect the energization of a solenoid 265 associated with the control valve 230. With the solenoid 265 energized, the valve is actuated and operates to direct pressure fluid from the branch supply line 232 through the valve and into the line 234 that communicates with an inlet port of the hydraulic motor 67. Pressure fluid supplied to the motor 67 via the line 234 will operate the motor in a direction to effect the rotation of the arm 51 in a counterclockwise direction, as viewed from the front of the machine. As pressure fluid is supplied to the motor 67 via the line 234, exhaust fluid from the motor will flow into the line 233 and by operation of the valve 230 will be directed into the return line 236. The counterclockwise rotation of the arm 51 will continue until a cam 266 carried by a cam disc 267, shown schematically on FIG. 6 as being secured to the shaft 54 but which is actually secured to the rotary drive sleeve 61 shown in FIG. 3, actuates a limit switch 268. The limit switch 268 upon being actuated will effect the deenergization of the solenoid 265 associated with the control valve 230. The valve 230 will thereupon be actuated to a neutral position and operates to interrupt the flow of pressure fluid to the hydraulic motor 67, with the arm 51 in a horizontal parked position against the positive stop 57. It will be noted that the cam disc 267 is provided with a second cam 269 which is located on the peripheral surface of the disc diametrically opposite the cam 266. The cams 266 and 269 are disposed in position so that upon rotation of the disc 267 in one direction or the other, one or the other of the cams will actuate the limit switch 268 to terminate counterclockwise rotation of the arm 51. It is to be noted that only one cam actuates the limit switch 268 during one interchange cycle of operation and that the other cam, spaced 180° apart therefrom, actuates the switch during an alternate cycle.

After the arm 51 has been rotated 90° in a counterclockwise direction to the parked position actuating the limit switch 268, the actuated limit switch 268 effects the deenergization of the solenoid 212 associated with the brake actuator valve 211 and the valve is actuated to block the flow of pressure fluid to the hydraulic actuator 219A of the brake mechanism 210 and simultaneously connect the hydraulic actuator 210A to drain. This will release the brake mechanism 210 so that the spindle 40, with the tool 37 secured therein, is free to rotate. With the brake mechanism 210 released, the spindle drive clutch mechanism (not shown) is again engaged to re-establish the drive connected to one or the other of the spindle drive gears 103 or 104, shown in FIG. 3.

As the spindle 40 is being operated in a work operation with the coded first tool 37, the magazine 45 is again indexably rotated in a clockwise direction to move the tool storage support 48, in which the previously used last tool 36A of the previous group of tools is stored, out of the tool change station 35 and to position the next tool storage support 48, in which the second tool 37A of the new group of tools is stored, into the tool change station 35. However, the tool storage support 48, with the previously used tool 36A stored therein, is still in an outwardly tilted tool change position and therefore must be tilted or retracted inwardly to an index position. Both the retraction of the tool storage support 48 and the clockwise rotation of the drum 45 for positioning the next tool in a tool change station is accomplished simultaneously.

To effect the simultaneous energization of the drum motor 116 and the storage support tilt actuator 183 to move the tool storage support from a tool change position to a tool index position simultaneously with the initiation of clockwise rotation of the drum 45, the solenoid operated control valve 217 is actuated by energizing the associated solenoid 218 and simultaneously therewith deenergizing the solenoid 216 associated with the valve. The simultaneous energization and deenergization of the solenoids 218 and 216 respectively, is effected upon the actuation of the limit switch 268 which was accomplished when the arm 51 was rotated to its parked position, as previously described. With the solenoid 218 energized, the valve 217 is actuated and operates to connect the supply line 206 via the connected branch line 219 to the line 221 that is connected to an inlet port of the hydraulic drum motor 116. The pressure fluid supplied to the motor 116 via the line 221 will effect the operation of the motor 116 for driving the drum 45 in a clockwise direction. As the fluid motor 116 operates to drive the drum 45 in a clockwise direction, exhaust fluid from the motor will return to the reservoir 203 via the line 222, the valve 216, the line 223, and the return line 225.

The pressure fluid supplied to the line 221 will also flow into the connected line 187 which is in communication with the rod end of the cylinder 182 of the tilt actautor 183. Pressure fluid is supplied to the actuator 183 via the line 187 and will effect the operation of the actuator so that it will operate to effect the inward retracting tilt movement of the tool storage support 48 in which the tool 36A is stored into an index position. As the actuator 183 operates to retract the support 48, exhaust fluid from the cylinder 182 will flow via the line 186 into the line 222 to combine with the exhaust fluid from the motor 116.

With the motor 116 operating to drive the drum 45 in a clockwise direction for moving the tool storage support 48, in which the second tool 37A of the new group of tools is stored, into the tool change station 35, the tool 37A moving with the drum will move past the switch 195. Since only the first tool 37 is coded, it is the only tool that will actuate the limit switch 195. Therefore, as the second tool 37A, carried by the tool storage support 48, moves past the limit switch 195 it will not actuate the switch. However, the roller 149 associated with a directly oppositely located tool storage support will actuate the limit switch 196. At this time, however, the actuation of the limit switch 196 has no effect on the control system for the arrangement is such, that after the initial actuation of the code limit switch 195, the limit switch 196 must be actuated twice to have any effect in the control system. Therefore, as the tool storage support 48, carrying the second tool 37A, moves through the tool change station 35 to a position to the left thereof, as viewed from the front of the machine, the roller 149 of the following tool storage support 48 adjacent the diametrically oppositely located tool storage support will actuate the limit switch 196 a second time in this sequence. With the limit switch 196 actuated twice, the solenoid 218 associated with the drum rotation control valve 217 is deenergized so that the valve is actuated to terminate the clockwise rotation of the drum 45. Simultaneously therewith, the solenoid 216 associated with the valve 217 is energized and actuates the valve for directing the pressure fluid to the motor 116 to operate it in a direction to effect a counterclockwise rotation of the drum 45 and also simultaneously therewith, to supply pressure fluid to the tilt actuator 183 for moving the tool storage support 48, in which the tool 37A is stored, outwardly into a tool change position. As previously mentioned, the counterclockwise rotation of the drum 45 continues until the outwardly tilted support 48 engages the positive stop 190 to stop the counterclockwise rotation of the drum 45.

With the second tool 37A of the group of tools 37, 37A and 37B located outwardly in horizontal tool change position of the tool change station 35, a complete tool change cycle has been accomplished. The second tool change cycle of operation will not again be initiated until the tool change button [not shown] is again actuated to initiate a second cycle of arm movement to interchange the second tool 37A with the first tool 37.

An electrical circuit, of which the variously described limit switches are a part, has not been illustrated as it is not believed that such a circuit is necessary for full understanding of the invention set forth herein. However, an electrical circuit, suitable for the machine shown, is set forth in detail in the aforementioned co-pending U.S. patent application, Serial No. 220,413.

Figure 7:
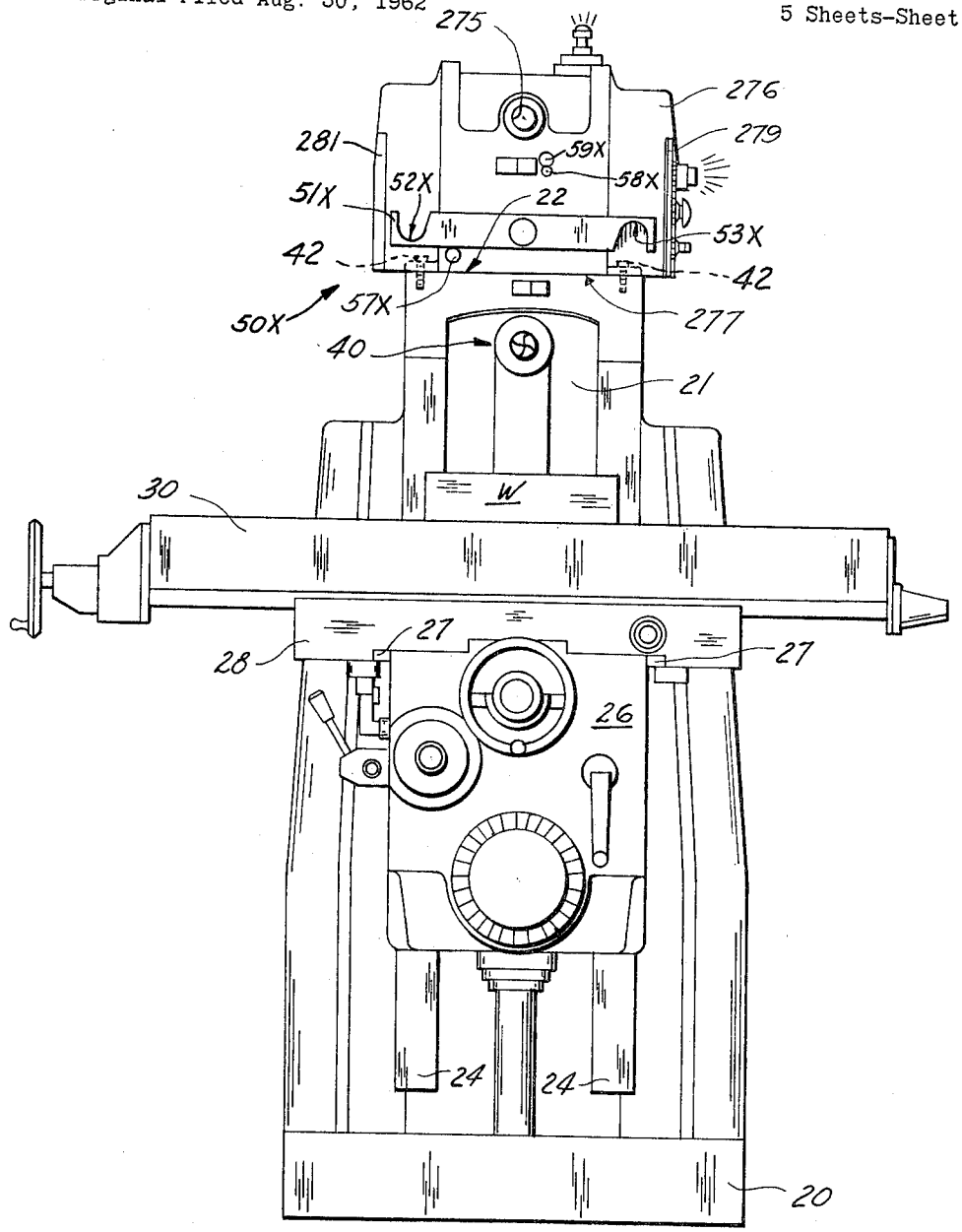

In FIG. 7, there is represented a modification of the invention in which the tool change carrier 50X is operatively disposed to effect an interchange of tools between the tool spindle 40 and a single storage socket 275.

The basic portions of the machine structure, comprising the column 21, saddle 28, knee 26 and table 30, as well as the spindle 40, are all identical to the structure illustrated in FIGURE 1, and therefore, the identical parts will be identified by the same identifying numbers previously used. The tool spindle 40 is provided with the tool clamping collet 106, shown in FIG. 3, together with the associated control apparatus represented schematically in the hydraulic diagram of FIG. 6. As previously mentioned, common reference numbers have been applied to identify identical parts hereinbefore described, shown on the drawings. The tool change carrier 50X is operatively carried by a modified hollow housing structure 276 for coordinated rotatable and axial movement relative to positive stops 57X and 58X. The frame or housing 276 is provided with a flat machined undersurface 277 for bearing engagement with the machined surface 41 provided on the top of the column 21 previously described. The housing 276 is removably mounted on the top surface 41 of the column 21 in the same manner as the frame or housing 23 being secured there in postion by means of the bolts 42. Cover plates 279 and 281 on either side of the housing 276 are removably secured in position by means of screws [not shown] and provide access into the interior of the housing 276 for manipulating the bolts 42 for securing or removing the housing 276 to or from the column 21. A movable stop 59X is likewise movably carried by the frame or housing 276 and operates both as a positive stop and as a movable guide member, as previously described. The tool change arm 51X of the tool changing mechanism 50X is operatively disposed relative to the tool receiving spindle 40 and the single stationary tool receiving storage socket 275 that is provided in the upper portion of the hollow housing 276. The stationary storage socket 275 is positioned in parallel spaced relationship to the tool receiving spindle 40 that is journaled in the upper portion of the machine column 21. The single storage socket 275 is adapted to removably support a tool in the same tool change station 35 described in connection with the tiltable support storage drum represented in FIGURE 1.

In operating a machine incorporating the modification shown in FIG. 7, a tool would manually be withdrawn from the single storage socket 275 and replaced with the next tool required for the next machining operation. This manual removal of the tool from the storage socket would be accomplished while a machining operation with the tool in the spindle is in progress. Thus, at the completion of a machining operation by one tool, the next required tool is positioned in the stationary storage socket 275 in readiness for a tool change cycle.

With the pair of tools respectively mounted in the storage socket 275 and the tool spindle 40, the tool change carrier arm 51X is operated to effect an interchange of tools therebetween. The operation of the tool change mechanism in a tool change cycle is identical to that hereinbefore described in detail with reference to the other drawings. However, since no preliminary positioning or indexing movement of a storage magazine is necessary, the operating controls are simplified. In all other respects, the operating controls previously described in connection with the hydraulic diagram, shown in FIG. 6, applies the simplified modification of the invention, shown in FIG. 7.

From the foregoing detailed description of the illustrative embodiments sets forth herein to exemplify the present invention, it will be apparent that there has been provided an improved tool change mechanism in combination with the novel tool storage means.

Although the illustrative embodiments of the invention have been described in considerable detail for the purpose of disclosing a practical operative structure whereby the invention may be practiced advantageously, it is to be understood that the particular apparatus described is intended to be illustrative only and that the various novel characteristics of the invention may be incorporated in other structural forms without departing from the spirit and scope of the invention as described in the subjoined claims.

The principles of this invention having now been fully explained in connection with the foregoing description, we hereby claim as our invention:

1. In a machine tool:
   a base;
   a column mounted on said base and extending upwardly therefrom;
   a removable housing mounted on the top of said column;
   means securing said housing to said column in operating position;
   a tool receiving spindle journaled in said column;
   tool storage means supported by said housing for storing the tools that are to be used in said spindle;
   a tool transfer member movably carried by said housing for interchanging tools between said spindle and said storage means; and,
   actuating means mounted in said removable housing and connected to said tool transfer member for actuating said member in its movements for performing the tool transfer operation.

2. A machine tool according to claim 1 including:
   a machined surface on the top of said column; and
   a machine surface on the bottom of said housing for engagement with the machined surface of said column so that when said machined surfaces are in engagement, said housing constitutes an upward extension of said column.

3. A machine tool according to claim 1 wherein said tool storage means comprises:
   a magazine having a tool change station and being adapted to carry a plurality of tools for use in said spindle, said magazine being movably supported by said housing for individually moving said tools into the tool change station; and,
   said tool transfer member comprises an arm rotatably supported by said housing for engaging and transferring it to said spindle and for engaging the previously used tool in said spindle and transferring it to the tool change station.

4. In a machine tool:
   a frame;
   a tool receiving spindle journaled in said frame for operating a tool in a work operation;
   a tool storage magazine carrying a plurality of tools for use in said spindle and being rotatably mounted for individually moving the tools into a tool change station;
   abutment means engaged by said magazine upon rotation thereof for stopping such rotation to locate the succeeding tool at the tool change station; and,
   tool transfer means actuatable to interchange the tools between said tool change station and said spindle.

5. A machine tool according to claim 4 wherein said abutment means comprises:
   a fixed stop mounted on said frame;
   an abutment carried by said magazine for movement between a retracted inoperative position and an extended position wherein it is located in the path of said fixed stop; and,
   actuating means responsive to the approach of the selected tool into the tool change station to shift said abutment to its extended position wherein it is moved with the rotation of said magazine into engagement with said stop for stopping the rotation of said magazine when the succeeding tool is located in the tool change station.

6. A machine tool according to claim 5 wherein said abutment means comprises:
   a plurality of tool receptacles carried by said magazine for movement individually into the tool change station by the rotation of said magazine, said receptacles being mounted for pivotal movement between a retracted position and an extended position relative to said magazine; and,
   an abutment face on each of said receptacles in position to be disposed in the path of said fixed stop when the associated stop is located in its extended position so that said abutment face will engage said stop for locating the extended receptacle in the tool change position.

7. A machine tool acocrding to claim 5 including:
   a source of power connected to said magazine for driving it in its rotary movement;
   reversing means responsive to the passage of the succeeding tool past the tool change station to reverse the direction of rotation of said magazine; and,
   control means responsive to the passage of the selected tool past the tool change station to activate said actuating means for extending said abutment so that during the reverse rotation of said magazine said abutment engages said stop to terminate rotation of the magazine with the succeeding tool located in the tool change station.

8. The machine tool according to claim 7 including:
   a fixed guideway having a movable portion adjacent the tool change station, said guideway defining a path of travel for said movable tool storage receptacles toward and away from the tool change station and operable to maintain said receptacles in retracted position as they are moved to the tool change station.

9. In a machine tool:
   a base;
   a column mounted on said base and extending upwardly therefrom;
   a tool receiving spindle journaled in said column;
   a socket fixedly mounted in said column for individually receiving the tools used in said spindle, the axis of said socket being parallel to the axis of said spindle;
   a tool transfer member movably carried by said column for interchanging the tools between said socket and said spindle; and
   actuating means mounted in said column and connected to said tool transfer member for actuating said member in its movements for performing the tool interchange operation.

10. A machine tool according to claim 9 including:
    a housing removably secured to the column in a manner to constitute an upward extension of the column and in which said socket, said tool transfer member, and said tool transfer member actuating means, are operatively carried.

11. A machine tool according to claim 10 in which said socket and said tool transfer member are carried in said housing in vertical alignment relative to each other and also with said spindle; and,
    said tool transfer member is disposed intermediate of said socket and said spindle.

No references cited.

RICHARD H. EANES, JR., *Primary Examiner.*